Patented Sept. 20, 1932

1,878,965

UNITED STATES PATENT OFFICE

WALTER MIEG, OF OPLADEN, AND ROBERT BERLINER, OF LEVERKUSEN-ON-THE-RHINE, GERMANY, ASSIGNORS TO GENERAL ANILINE WORKS, INC., OF NEW YORK, N. Y., A CORPORATION OF DELAWARE

VAT DYESTUFF OF THE ANTHRAQUINONE ACRIDONE SERIES

No Drawing. Application filed April 16, 1930, Serial No. 444,866, and in Germany April 22, 1929.

The present invention relates to new vat dyestuffs of the anthraquinone series.

We have found that new vat dyestuffs of the anthraquinone series are obtainable by reacting upon a halogenated anthraquinone compound with a compound of the probable formula:

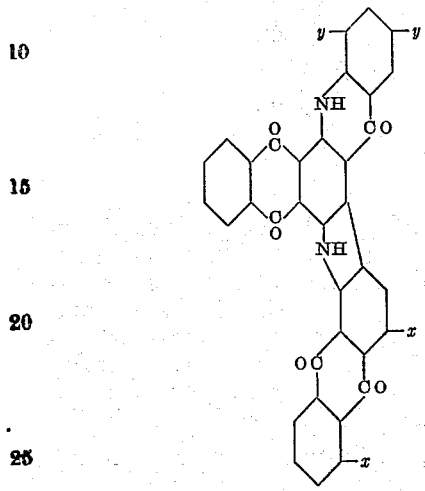

wherein one $x$ means hydrogen and the other $x$ the amino group, $y$ stands for hydrogen or halogen. Under the term "halogenated anthraquinone compound" we understand as well halogen anthraquinones themselves as higher condensed halogenated products derived from anthraquinone, such as halogen benzanthrones (e. g. Bz-1-bromobenzanthrone), halogen anthraquinoneacridones, halogen dianthraquinonmylamine carbazoles (e. g. 4.4'-dibromo-1.1'-dianthraquinonylamine carbazole), halogen pyranthrones (e. g. tetrabromo-pyranthrone) halogen anthanthrones (e. g. 2.7-dibromoanthanthrone, monobromoanthanthrone, di- and tetrabromoanthanthrones), halogen dibenzanthrones, halogen isodibenzanthrones, etc., which compounds can be further substituted by other monovalent substituents, more particularly by acylamino groups, hydroxy groups or alkoxy groups.

The reaction may be performed by causing the starting components to react with one another in the presence of a high boiling organic solvent, such as nitrobenzene, naphthalene, trichlorobenzene and the like, advantageously at a temperature above about 180° C. with or without the addition of an acid binding agent, such as sodium acetate, potassium- or sodium-carbonate and the like, and of a copper catalyst, such as copper powder, copper acetate, copper chloride, cuprous chloride and the like. The reaction products generally separate during the reaction and may be isolated in the usual manner, for example, by sucking off, washing with alcohol and water, boiling with diluted hydrochloric acid in order to remove the copper catalyst, washing with water until neutral and drying. The products thus obtainable probably correspond to the general formula:

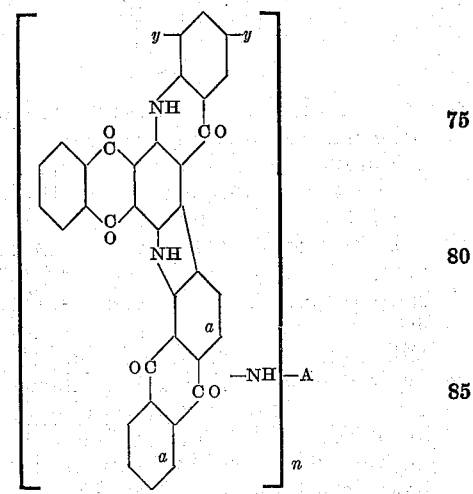

wherein $y$ represents hydrogen or halogen, $n$ means one of the numbers 1-4 and A stands for the radical of an anthraquinone compound as defined above, which may be substituted by a substituent of the group consisting of halogen atoms, acylamino groups, hydroxy groups and alkoxy groups, the NH-group being linked to one of the positions marked $a$.

It may be mentioned that when starting with a halogenated anthraquinone compound containing more than one halogen atom, it will be possible to replace the halogen atoms partly or totally by the radical of the second starting material, depending on the molecular quantities of the starting materials applied.

Our new products form dark crystalline powders, almost insoluble in the usual organic solvents, soluble in strong sulfuric acid with dull red to bluish-grey colorations, dyeing cotton from an alkaline hydrosulfite vat strong brown to black shades of excellent fastness properties and good evenness.

The invention is illustrated by the following examples without being restricted thereto, the parts being by weight.

*Example 1*

5 parts of the product of the probable formula:

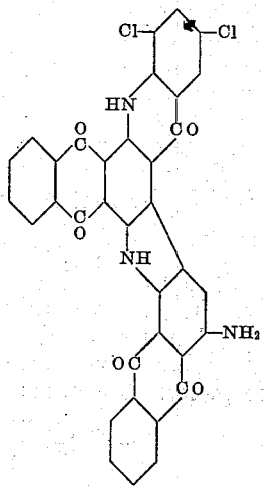

(obtainable for instance by condensing trichloro-anthraqpinone-acridone with 1-benzoylamino-4-amino-anthraquinone, carbazolization and saponification) are heated to boiling for 15–20 hours with 4 parts of 1-chloroanthraquinone, 200 parts of naphthalene, 3 parts of sodium carbonate and 0,6 part of copper powder. The melt is then diluted with solvent naphtha and sucked off while still hot. The residue is boiled out after drying with diluted hydrochloric- or nitric acid. A dark powder, dissolving dirty brown in sulfuric acid is thus obtained. When pouring the sulfuric acid solution into water, grey flakes are obtained. The dyestuff dyes cotton from a yellow-brown alkaline hydrosulfite vat fast grey shades. It probably corresponds to the formula:

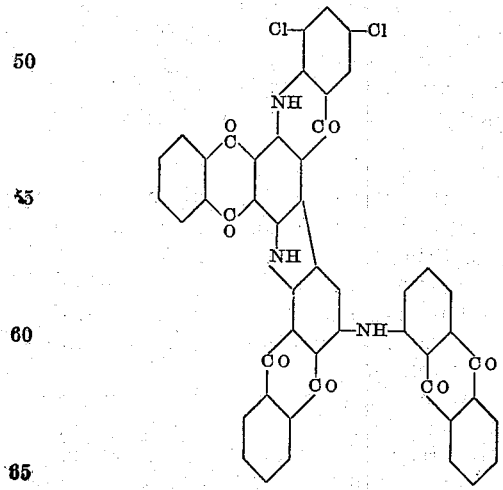

*Example 2*

5 parts of the product of the formula:

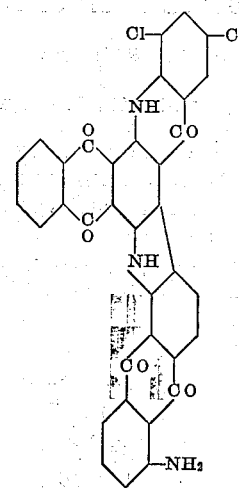

(obtainable analogous to the product of Example 1 by using 1-benzoylamino-5-aminoanthraquinone) are melted together, as described above, with 4 parts of 1-benzoylamino-5-chloroanthraquinone, 3 parts of sodium carbonate, 0,6 part of copper powder and 200 parts of naphthalene for about 15 hours. The melt is then worked up in the usual manner. The dark reaction product thus obtainable dissolves in sulfuric acid with a dirty red coloration. The dyestuff dyes cotton from a brown alkaline hydrosulfite vat reddish-grey shades. It probably corresponds to the formula:

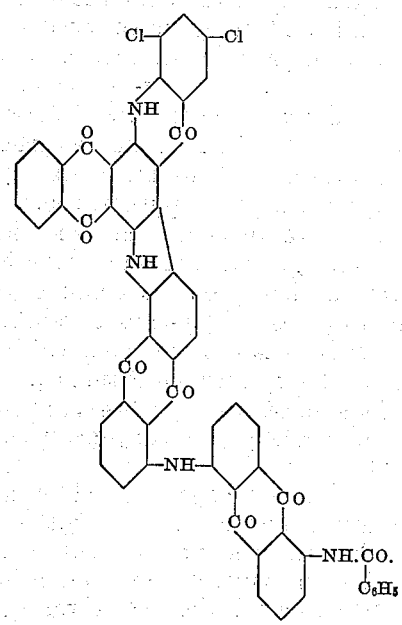

Example 3

10 parts of the starting material of Example 1 are heated to boiling for one day together with 10 parts of 1-benzoylamino-4-chloroanthraquinone, 5 parts of sodium acetate, 0,5 part of copper powder, 0,5 part of cuprous chloride and 200 parts of naphthalene. Hereafter the melt is worked up in the usual manner. The reaction product dissolves in sulfuric acid with a brown coloration and dyes cotton from a yellow-brown alkaline hydrosulfite vat grey to black shades. It probably corresponds to the formula:

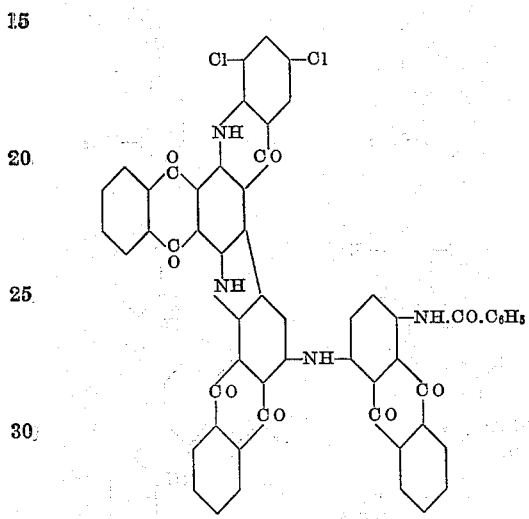

Example 4

5 parts of the starting material of Example 1 are condensed with 4 parts of trichloroanthraquinoneacridone in the presence of 1 part of sodium acetate, 0,2 part of copper chloride, some copper powder and 200 parts of napththalene, and worked up in the usual manner. The condensation product dissolves with a brown coloration in sulfuric acid and dyes cotton from a yellow-brown vat grey to black shades of good fastness properties. It probably corresponds to the formula:

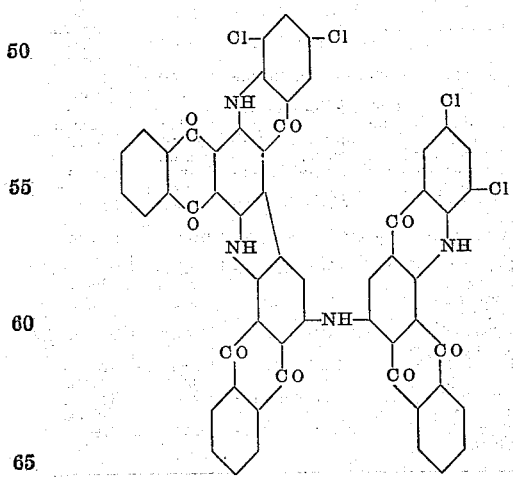

Example 5

6,7 parts of the starting material of Example 2 are heated to boiling for about two days together with 3 parts of Bz.Bz'1-dibromopyranthrone, 3 parts of sodium carbonate, 0,5 part of copper powder and 200 parts of naphthalene. After working up in the usual manner, a dark powder, dissolving in sulfuric acid with a deep blue-violet shade, is obtained.

When pouring into water, dark-brown flakes separate. The dyestuff dyes cotton from a Bordeaux-red alkaline hydrosulfite vat strong black-brown shades of excellent fastness properties. It probably corresponds to the formula:

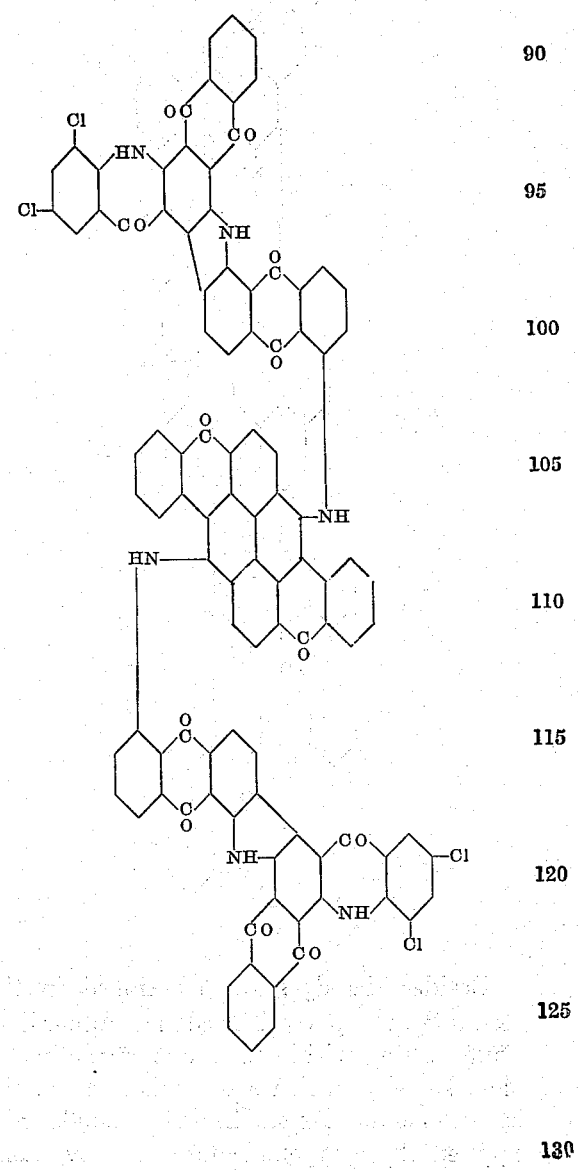

Example 6

11 parts of the starting material of Example 2, 4 parts of 2.7-dibromoanthanthrone, 6 parts of sodium carbonate, 1 part of copper powder are heated to boiling for 15–20 hours with 400 parts of naphthalene. The reaction product forms a dark powder, dissolving in sulfuric acid wtih a dull violet coloration. When pouring this solution into water, black flakes are obtained. The dyestuff dyes cotton from a brown alakline hydrosulfite vat deep black shades of excellent fastness properties. It probably corresponds to the formula:

Besides the dyestuffs mentioned in the examples, we have prepared many other dyestuffs falling within the scope of the invention, some of which are enumerated in the scheme below. As starting compounds were applied the compounds indicated by name in the scheme and the products of the probable formulae:

A         B

C         D

| Starting components | Color of the aqueous paste | Color of the dyeings on cotton |
|---|---|---|
| 1 mol of product A+1 mol 2-bromo-anthraquinone. | Dark-corinth | Violet-brown |
| 1 mol of product A+1 mol 1-benzoylamino-4-chloroanthraquinone. | Grey | Grey |
| 1 mol of product B+1 mol 1-benzoylamino-5-chloroanthraquinone. | Corinth | Violet-brown |
| 1 mol of product B+1 mol 1-chloroanthraquinone. | Corinth | Violet-brown |
| 2 moe of product A+1 mol 1.5-dibromo-anthraquinone. | Dark-violet | Violet-grey |
| 2 mol of product A+1 mol 4.4'-dibromo-1.1'-dianthraquinonylamine. | Brown-black | Violet-brown |
| 2 mol of product A+1 mol dibromo-1.1'-dianthraquinonylamine-carbazole. | Dark-brown | Brown |
| 2 mol of product A+1 mol alpha-alpha'-dibromo-pyranthrone. | Dark-brown | Brown |
| 2 mol of product D+1 mol Bz.Bz'-dibromo-pyranthrone. | Brown | Brown |
| 3 mol of product A+1 mol tetrabromo-pyranthrone. | Brown | Brown |
| 2 mol of product A+1 mol 6.6'-dibromo-dibenzanthrone. | Bluish-black | Grey to black |
| 1 mol of product C+1 mol 1-benzoylamino-5-chloroanthraquinone. | Grey | Grey |
| 2 mol of product C+1 mol alpha-alpha'-dibromo-pyranthrone. | Brown | Brown |
| 2 mol of product C+1 mol 2.7-dibromo-anthanthrone. | Greenish-black | Grey to black |
| 1 mol of product D+1 mol 1-benzoylamino-4-chloroanthraquinone. | Grey | Grey to black |
| 1 mol of product D+1 mol 1-chloroanthraquinone. | Grey | Grey |

We claim:—
1. The products of the probable formula:

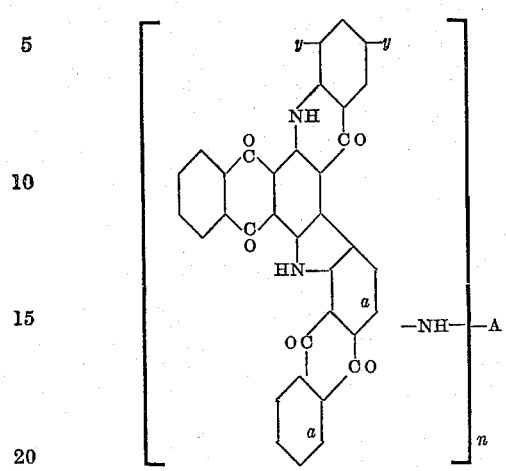

wherein $y$ represents hydrogen or halogen, $n$ means one of the numbers 1–4 and A stands for the radical of an anthraquinone compound, which may be substituted by a substituent of the group consisting of halogen atoms and acylamino groups, the NH-group being linked to one of the positions marked $a$, said products forming dark crystalline powders almost insoluble in the usual organic solvents, soluble in strong sulfuric acid with dull red to bluish-grey colorations, dyeing cotton from an alkaline hydrosulfite vat strong brown to black shades of excellent fastness properties.

2. The products of the probable formula:

wherein A stands for the anthanthrone nucleus, $n$ means one of the numbers 1–2, the NH-group being linked to one of the positions marked $a$, said products forming dark crystalline powders almost insoluble in the usual organic solvents, soluble in strong sulfuric acid with dull red to bluish-grey colorations, dyeing cotton from an alkaline hydrosulfite vat strong violet-brown to black shades of excellent fastness properties.

3. The product of the probable formula:

said product forming a dark powder dissolving in sulfuric acid with a dull violet coloration, dyeing cotton from a brown alkaline hydrosulfite vat deep black shades of excellent fastness properties.

In testimony whereof, we affix our signatures.

WALTER MIEG.
ROBERT BERLINER.